(12) United States Patent
Saini et al.

(10) Patent No.: US 9,216,645 B1
(45) Date of Patent: Dec. 22, 2015

(54) CAB-MOUNTED EXHAUST PIPE DE-COUPLER

(71) Applicant: International Truck Intellectual Property Company, LLC, Lisle, IL (US)

(72) Inventors: Gagandeep Saini, Lisle, IL (US); Gregory Miller, Oak Park, IL (US); Jason B. Arriaga, Yorkville, IL (US); Mike Shovels, Aurora, IL (US); Thomas Lynn Cumbey, Jr., Oswego, IL (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 0 days.

(21) Appl. No.: 14/337,877

(22) Filed: Jul. 22, 2014

(51) Int. Cl.
*B60K 13/04* (2006.01)
*B62D 33/06* (2006.01)

(52) U.S. Cl.
CPC ............... *B60K 13/04* (2013.01); *B62D 33/06* (2013.01)

(58) Field of Classification Search
CPC .... B60K 13/04; F16L 55/035; F01N 2590/08
USPC .......................................... 180/309, 89.2, 296
See application file for complete search history.

(56) References Cited

U.S. PATENT DOCUMENTS

| | | | |
|---|---|---|---|
| 4,192,142 A * | 3/1980 | Haegele | .......................... 60/322 |
| 5,649,685 A | 7/1997 | Keller | |
| 5,873,429 A | 2/1999 | Qutub | |
| 5,908,187 A | 6/1999 | Kalkoske | |
| 6,095,460 A | 8/2000 | Mercer | |
| 6,213,243 B1 | 4/2001 | Studebaker | |
| 6,383,243 B1 | 5/2002 | Yoder | |
| 6,394,217 B2 | 5/2002 | Studebaker | |
| 6,637,538 B2 | 10/2003 | Morykon et al. | |
| 7,478,700 B2 | 1/2009 | Connelly | |
| 7,614,475 B2 | 11/2009 | Askew | |
| 7,678,168 B2 | 3/2010 | Connelly et al. | |
| 2007/0169981 A1 * | 7/2007 | Connelly | ....................... 180/309 |

* cited by examiner

*Primary Examiner* — Hau Phan
*Assistant Examiner* — Bryan Evans
(74) *Attorney, Agent, or Firm* — Jeffrey P. Calfa; Mark C. Bach

(57) ABSTRACT

A motor vehicle in which a de-coupler has a first attachment point to a cab body, a second attachment point to a vertical engine exhaust pipe, and a de-coupler mechanism having at least one ball joint which allows limited vertical and limited horizontal movement of the engine exhaust pipe relative to the cab body.

6 Claims, 3 Drawing Sheets

CAB-MOUNTED EXHAUST PIPE DE-COUPLER

TECHNICAL FIELD

The disclosed subject matter relates to a motor vehicle, such as a truck vehicle, having a vertical exhaust pipe through which engine exhaust is exhausted.

BACKGROUND

Different arrangements for mounting a vertical exhaust pipe on large vehicle such as a heavy truck may mount the pipe on a chassis frame of a vehicle and/or attach the pipe to a cab body of a vehicle. One known type of mounting comprises a stanchion which is mounted on a chassis frame and to which a vertical exhaust pipe is attached. A mounting of a vertical exhaust pipe on a vehicle may provide for some limited relative movement between the exhaust pipe and the cab body. One known attachment mechanism comprises a linear slide with a radial bearing. Certain exhaust pipes may have a flexible section.

SUMMARY

One general aspect of the disclosed subject matter relates to a vehicle having a chassis supporting a fuel-consuming engine which propels the vehicle and an exhaust system through which exhaust resulting from consumption of fuel in the engine is exhausted, including a vertical exhaust pipe through which exhaust is conveyed upwardly to an outlet from the exhaust pipe.

A cab body is supported on the chassis and has a wall which is proximate the exhaust pipe. A first member is held fast on the wall and a second member is held fast on the exhaust pipe.

A de-coupler has a first attachment point to the first member, a second attachment point to the second member, and a de-coupler mechanism comprising at least one ball joint which allows limited vertical and limited horizontal movement of the exhaust pipe relative to the cab body.

The foregoing summary is accompanied by further detail of the disclosure presented in the Detailed Description below with reference to the following drawings which are part of the disclosure.

DETAILED DESCRIPTION

Figure 1:
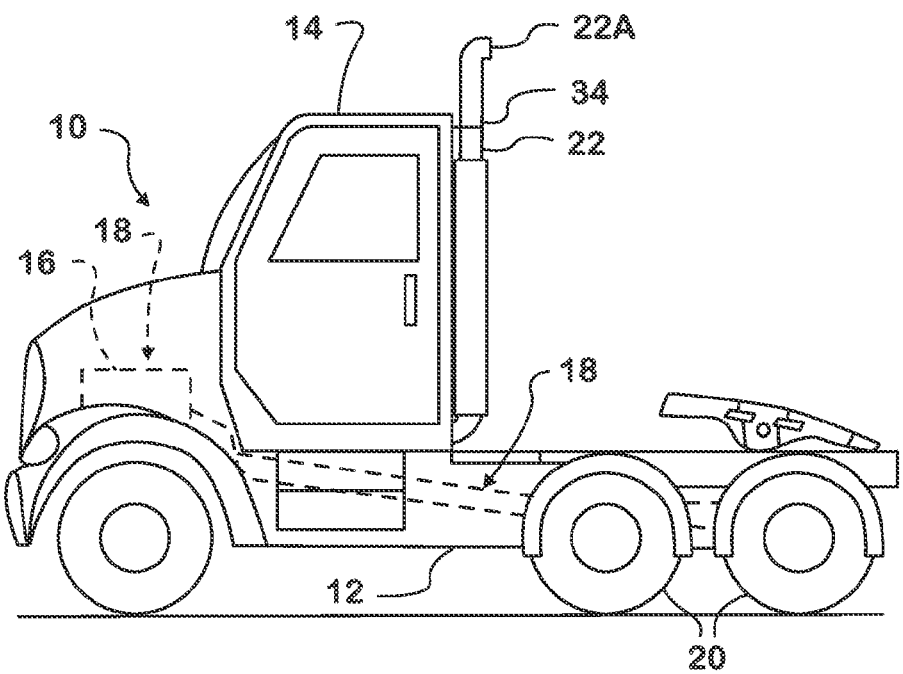
FIG. 1 is a left side view of a truck vehicle.

FIG. 1 shows a truck vehicle 10 having a chassis 12 and a cab body 14 supported on a frame of chassis 12 which also supports a fuel-consuming engine 16 of a powertrain 18. Engine 16 operates through a drivetrain of powertrain 18 to drive wheels 20 which propel the truck vehicle on land.

Engine 16 has an exhaust system through which exhaust resulting from consumption of fuel in engine 16 is exhausted.

The exhaust system includes vertical exhaust pipe 22 through which exhaust coming from engine 16 is conveyed upwardly to an outlet 22A.

Cab body 14 comprises a wall which is proximate exhaust pipe 22. More detail appears in FIG. 2 which shows the wall to comprise a vertical side wall 24 and a vertical rear wall 26 which come together at a corner 28 which is proximate exhaust pipe 20. Corner 28 is shown as the left rear corner of the cab body.

Figure 2:
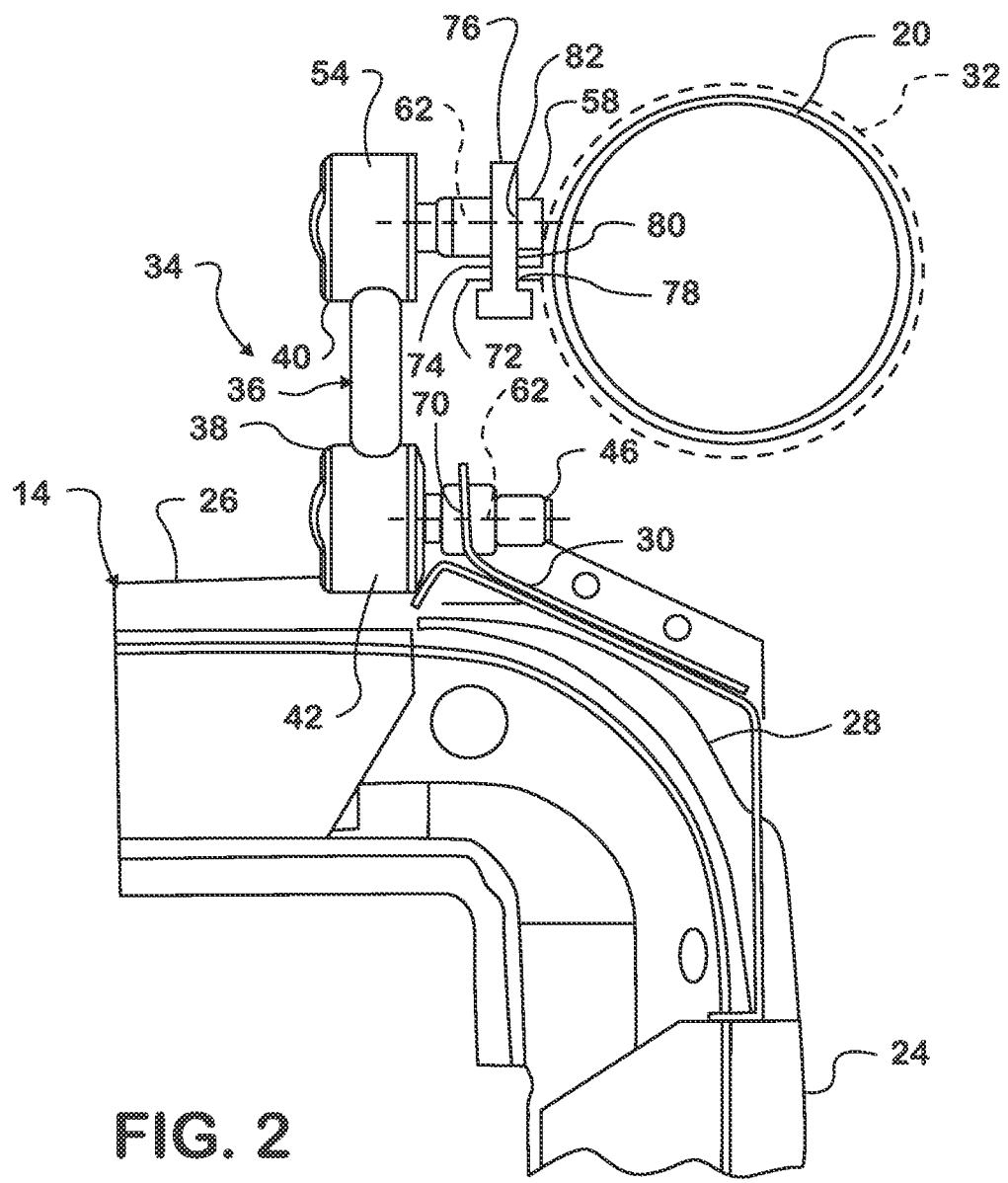
FIG. 2 is a horizontal cross section view through a rear corner of the truck vehicle and a vertical exhaust pipe, a view which includes a de-coupler between the two.

FIG. 2 shows a bracket 30 fastened to the cab body wall at corner 28. A circular band 32 encircles and is clamped around the outside of exhaust pipe 20. A de-coupler 34 has a first attachment point to bracket 30 and a second attachment point to band 32. De-coupler 34 comprises a de-coupler mechanism 36 comprising at least one ball joint which allows limited vertical and limited horizontal movement of exhaust pipe 20 relative to cab body 14. De-coupler 34 comprises a first ball joint 38 and a second ball joint 40.

First ball joint 38 comprises a generally cylindrical housing 42, a ball 44 (see FIGS. 3 and 4 also) disposed within housing 42, and a stem 46 extending from ball 44 out of housing 42. Stem 46 has an axis 48 which intersects a center 50 of ball 44. Housing 42 contains a mounting for ball 44 which allows ball 44 and stem 46 to turn together about axis 48 and axis 48 to angulate within an imaginary cone 52 having an apex at center 50.

Second ball joint 40 comprises a generally cylindrical housing 54, a ball 56 disposed within housing 54, and a stem 58 extending from ball 56 out of housing 54. Stem 58 has an axis 60 which intersects a center of ball 56. Housing 54 contains a mounting for ball 56 which allows ball 56 and stem 58 to turn together about axis 60 and axis 60 to angulate within an imaginary cone having an apex at the center of ball 56. The balls in the ball joints are not necessarily completely spherical but may be truncated spheres. They are suitably lubricated for movement within their housings.

Figure 3:
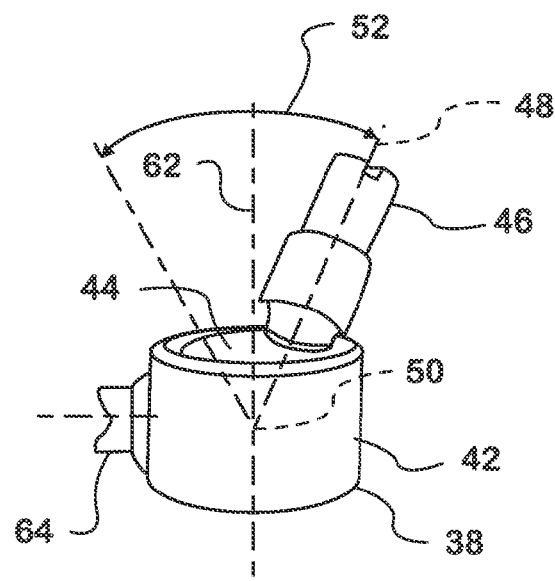
FIG. 3 is fragmentary perspective view of a portion of the de-coupler.
Figure 4:
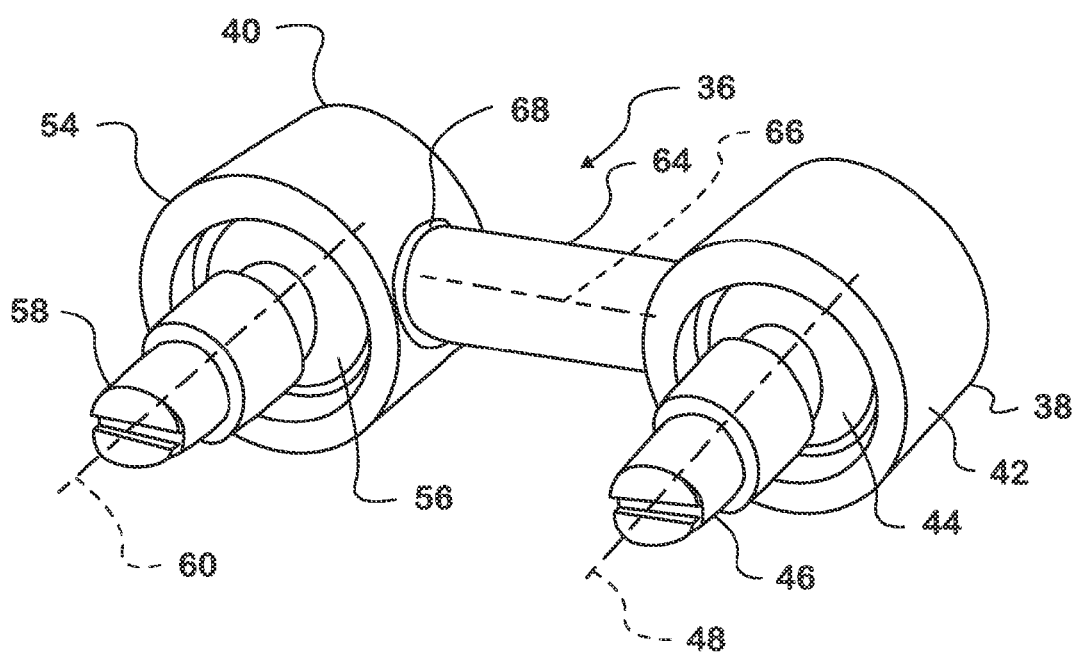
FIG. 4 is a perspective view of the de-coupler mechanism.

Each imaginary cone has a respective cone axis such as cone axis 62 in FIG. 3. With stems 46 and 58 in centered positions relative to housings 42 and 54, axes 48 and 60 are coincident with their respective cone axis 62.

Housings 42 and 54 are joined by a connecting bar 64 extending between them along an axis 66 which is perpendicular to the cone axes.

A joint 68 allows one housing 42, 54 to turn relative to the other about axis 66. Joint 68 limits relative turning of the housings about axis 66 to a limited angular range no greater than an acute angle.

Each mounting for the respective ball 44, 56 which allows the respective ball and the respective stem 46, 58 to turn together about the axis 48, 60 of the respective stem and to angulate within the respective imaginary cone, allows the respective ball and the respective stem to turn together 360° about the axis of the respective stem.

Bracket 30 comprises a through-hole 70 through which stem 46 of ball joint 38 passes. Fasteners on stem 46 may be used to clamp against the bracket on opposite sides of the through-hole.

Band 32 encircles exhaust pipe 20 and has confronting ears 72, 74 at opposite circumferential ends. A fastener 76 passes through through-holes 78, 80 in the confronting ears and is tightened in a threaded through-hole 82 in stem 58 which is perpendicular to axis 60, thereby tightly clamping band 32 to exhaust pipe 20.

FIG. 2 shows an arrangement of de-coupler 34 in which the respective cone axes 62 are parallel with one of the vertical walls, the rear wall 26 in this instance.

Figure 5:
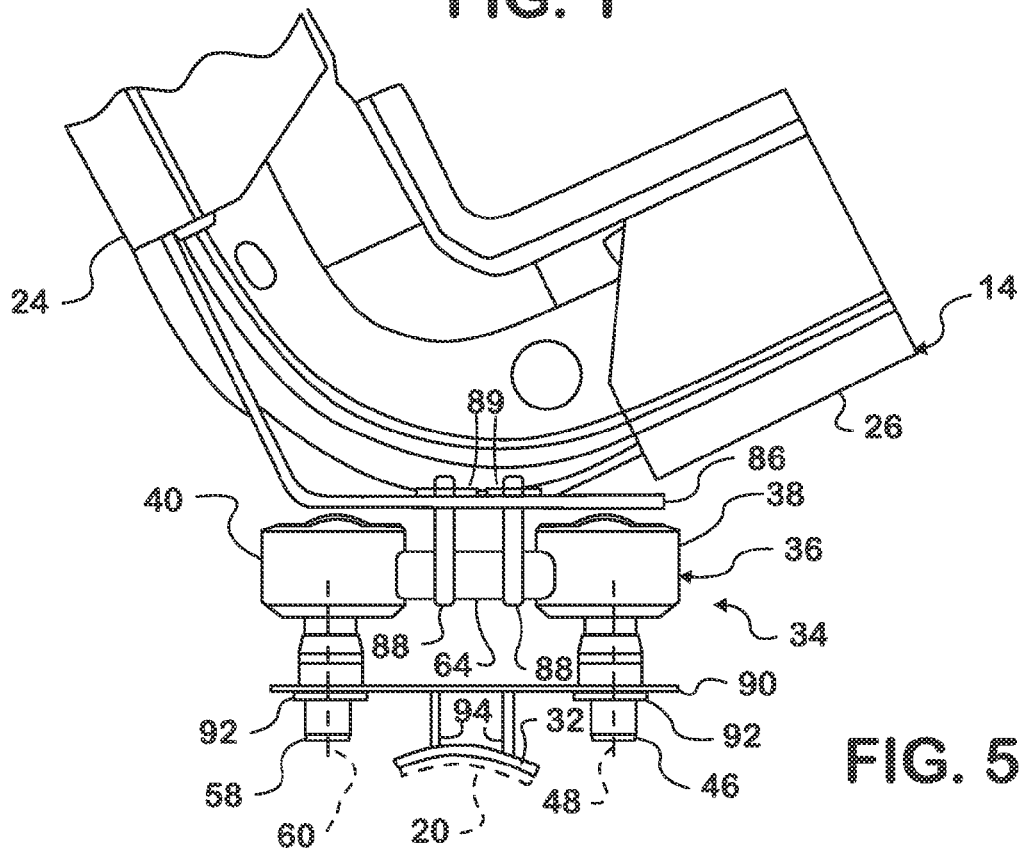
FIG. 5 is view similar to FIG. 2 showing an alternate embodiment.

FIG. 5 shows an arrangement of de-coupler 34 in which the respective cone axes are non-parallel with both vertical walls 24, 26. A bracket 86 on cab 14 provides for attachment of de-coupler mechanism 36 to the cab via connecting bar 64. Throats of U-bolts 88 are fit around connecting bar 64 and the threaded bolt ends are passed through holes in bracket 86. Nuts 89 are threaded onto the U-bolt ends to tightly secure housing 42, 54 of ball joints 38, 40 to cab 14.

Another bracket 90 is fit onto stems 46, 48 by passing the stems through holes in the bracket and then threading nuts 92 onto threaded ends of the stems and tightening the nuts to force bracket 90 against shoulders which extend around the circumferences of the stems. Bracket 90 includes members 94 via which the bracket joins with band 32. Ears 72, 74 (not shown in FIG. 5) are tightened together so that band 32 is tightly clamped around exhaust pipe 20.

What is claimed is:

1. A vehicle comprising:
   a chassis supporting a fuel-consuming engine which propels the vehicle;
   an exhaust system through which exhaust resulting from consumption of fuel in the engine is exhausted, including a vertical exhaust pipe through which exhaust is conveyed upwardly to an outlet from the exhaust pipe;
   a cab body supported on the chassis and having a wall which is proximate the exhaust pipe;
   a first member which is held fast on the wall;
   a second member which is held fast on the exhaust pipe;
   a de-coupler having a first attachment point to the first member, a second attachment point to the second member, and a de-coupler mechanism comprising at least one ball joint which allows limited vertical and limited horizontal movement of the exhaust pipe relative to the cab body, in which the at least one ball joint comprises a first ball joint and a second ball joint, in which each ball joint comprises a respective housing, a respective ball disposed within the respective housing, a respective stem extending from the respective ball out of the respective housing and having a respective axis which intersects a center of the respective ball; the respective housing containing a respective mounting for the respective ball which allows the respective ball and the respective stem to turn together about the axis of the respective stem and the axis of the respective stem to angulate within a respective imaginary cone having a respective apex on the center of the respective ball, in which each imaginary cone has a respective cone axis and the cone axes are mutually parallel, in which the housings are joined by a connecting bar extends between the housing of the first ball joint and the housing of the second ball joint along an axis which is perpendicular to the cone axes, including a joint which allows the housing of the first ball joint to turn relative to the housing of the second ball joint about the connecting bar axis, and in which the joint which allows the housing of the first ball joint to turn relative to the housing of the second ball joint about the connecting bar axis limits turning of the housing of the first ball joint relative to the housing of the second ball joint about the connecting bar axis to a limited angular range no greater than an acute angle.

2. A vehicle as set forth in claim 1 in which the respective mounting for the respective ball which allows the respective ball and the respective stem to turn together about the axis of the respective stem and the axis of the respective stem to angulate within a respective imaginary cone having a respective apex on the center of the respective ball allows the respective ball and the respective stem to turn together 360° about the axis of the respective stem.

3. A vehicle as set forth in claim 1 in which the first member comprises a cab-mounted bracket to which the stem of the first ball joint is fastened and the second member comprises an exhaust pipe engaging band to which the stem of the second ball joint is fastened.

4. A vehicle as set forth in claim 3 in which the cab-mounted bracket comprises a through-hole through which the stem of the first ball joint passes and the exhaust pipe engaging band encircles the exhaust pipe and has confronting ears at opposite circumferential ends, and a fastener passes through through-holes in the confronting ears and a through-hole in the stem of the second ball joint which is perpendicular to the axis of the stem of the second ball joint.

5. A vehicle as set forth in claim 1 in which the wall of the cab body comprises a vertical side wall and a vertical rear wall which come together at a corner which is proximate the vertical exhaust pipe, and the respective cone axes are parallel with one of the vertical walls.

6. A vehicle as set forth in claim 1 in which the wall of the cab body comprises a vertical side wall and a vertical rear wall which come together at a corner which is proximate the vertical exhaust pipe, and the respective cone axes are non-parallel with both vertical walls.

\* \* \* \* \*